(12) United States Patent
Carlough et al.

(10) Patent No.: US 8,566,385 B2
(45) Date of Patent: Oct. 22, 2013

(54) DECIMAL FLOATING POINT MULTIPLIER AND DESIGN STRUCTURE

(75) Inventors: Steven R Carlough, Poughkeepsie, NY (US); Daniel Lipetz, Poughkeepsie, NY (US); Joshua M Weinberg, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 12/629,081

(22) Filed: Dec. 2, 2009

(65) Prior Publication Data
US 2011/0131266 A1 Jun. 2, 2011

(51) Int. Cl.
*G06F 7/52* (2006.01)
(52) U.S. Cl.
USPC .......................................... 708/624
(58) Field of Classification Search
USPC ......................... 708/503, 623–624
See application file for complete search history.

(56) References Cited

U.S. PATENT DOCUMENTS

| | | |
|---|---|---|
| 3,890,496 A | 6/1975 | Hartzog |
| 3,927,311 A | 12/1975 | Chen et al. |
| 4,677,583 A | 6/1987 | Ohtsuki et al. |
| 5,119,325 A | 6/1992 | Viot et al. |
| 5,262,976 A | 11/1993 | Young et al. |
| 6,233,597 B1 | 5/2001 | Tanoue et al. |
| 6,622,154 B1 | 9/2003 | Hayashi et al. |
| 7,136,893 B2 | 11/2006 | Carlough et al. |
| 2004/0230631 A1 | 11/2004 | Busaba et al. |
| 2005/0010631 A1 | 1/2005 | Carlough et al. |

FOREIGN PATENT DOCUMENTS

| | | |
|---|---|---|
| EP | 0 428 942 A2 | 5/1991 |
| EP | 0 813 143 A2 | 12/1997 |
| JP | 57069450 | 4/1982 |
| JP | 59173845 | 10/1984 |
| JP | 63182739 | 7/1988 |
| JP | 08265159 A | 11/1996 |
| JP | 9097165 | 4/1997 |

OTHER PUBLICATIONS

"Decimal Floating-Point Multiplication Via Carry-Save Addition", Erle et al., 18th IEEE Symposium on Computer Arithmetic (ARITH'07), 0-7695-2854-6/07, 2007, 10 pages.
"A New Family of High-Performance Parallel Decimal Multipliers", Vazquez et al., 18th IEEE Symposium on Computer Arithmetic (ARITH'07), 0-7695-2854-6/07, 2007, 10 pages.

*Primary Examiner* — Tan V. Mai
(74) *Attorney, Agent, or Firm* — Cantor Colburn LLP; John Campbell

(57) ABSTRACT

Several implementations and a design structure for decimal multiplication that uses a BCD 4221 encoding scheme, separate accumulation of partial products, accumulation of the partial products into a final product and conversion from and to a BCD 8421 coding scheme.

18 Claims, 18 Drawing Sheets

| HEX | BCD-8421 | BCD-4221 | DECIMAL |
|---|---|---|---|
| 0000 | 0000 | 0000 | 0 |
| 0001 | 0001 | 0001 | 1 |
| 0010 | 0010 | 0100, 0010 | 2 |
| 0011 | 0011 | 0101, 0011 | 3 |
| 0100 | 0100 | 1000, 0110 | 4 |
| 0101 | 0101 | 1001, 0111 | 5 |
| 0110 | 0110 | 1100, 1010 | 6 |
| 0111 | 0111 | 1101, 1011 | 7 |
| 1000 | 1000 | 1110 | 8 |
| 1001 | 1001 | 1111 | 9 |
| 0010 | ---- | ---- | 10 |
| 1011 | ---- | ---- | 11 |
| 1100 | ---- | ---- | 12 |
| 1101 | ---- | ---- | 13 |
| 1110 | ---- | ---- | 14 |
| 1111 | ---- | ---- | 15 |

FIG.1

| INPUT-BCD-8421 | | | | OUTPUT-BCD-4221 | | | | |
| WEIGHT: | (8) | (4) | (2) | (1) | (1)*10 | (4) | (2) | (2) | |
| inDEC | in<4> | in<5> | in<6> | in<7> | out<3> | out<4> | out<5> | out<6> | outDEC |
| 0 | 0 | 0 | 0 | 0 | 0 | 0 | 0 | 0 | 0 |
| 1 | 0 | 0 | 0 | 1 | 0 | 0 | 1 | 0 | 2 |
| 2 | 0 | 0 | 1 | 0 | 0 | 1 | 0 | 0 | 4 |
| 3 | 0 | 0 | 1 | 1 | 0 | 1 | 1 | 1 | 6 |
| 4 | 0 | 1 | 0 | 0 | 1 | 0 | 0 | 0 | 8 |
| 5 | 0 | 1 | 0 | 1 | 1 | 0 | 1 | 0 | 10 |
| 6 | 0 | 1 | 1 | 0 | 1 | 1 | 0 | 0 | 12 |
| 7 | 0 | 1 | 1 | 1 | 1 | 1 | 1 | 0 | 14 |
| 8 | 1 | 0 | 0 | 0 | X | X | X | 1 | 16 |
| 9 | 1 | 0 | 0 | 1 | X | X | X | 1 | 18 |
| X | 1 | 0 | 1 | 0 | X | X | X | X | X |
| X | 1 | 0 | 1 | 1 | X | X | X | X | X |
| X | 1 | 1 | 0 | 0 | X | X | X | X | X |
| X | 1 | 1 | 0 | 1 | X | X | X | X | X |
| X | 1 | 1 | 1 | 0 | X | X | X | X | X |
| X | 1 | 1 | 1 | 1 | X | X | X | X | X | out<3>=in<4>+in<5>in<6>+in<5>in<7>
out<4>=in<4>+in<5>in<6>'in<7>'+in<5>'in<6>in<7>
out<5>=in<5>in<6>in<7>'+in<4>in<7>'+in<5>'in<6>'in<7>
out<6>=in<4>in<5>'in<6>'in<7>

FIG.2

| BITS | 0,1,2,3 | 4,5,6,7 | DECIMAL |
|---|---|---|---|
| in | 0011 | 1000 | 38 |
| out | 1101 | 1100 | 76 |

FIG.3

| BITS | | 0,1,2,3 | 4,5,6,7 | DECIMAL |
|---|---|---|---|---|
| in | | 0011 | 1000 | 38 |
| out | 0001 | 1001 | 000 | 190 |

FIG.5

| BITS | 0 | 0,1,2,3,4 | 5,6,7,8 | DECIMAL |
|---|---|---|---|---|
| in | 1 | 1010 | 011– | 146 |
| out | 1 | 1000 | 1100 | 146 |

FIG.7

| INPUT--BCD-8421 | | | | OUTPUT--BCD-4221 | | | | |
|---|---|---|---|---|---|---|---|---|
| WEIGHT: | (10) | (8) | (4) | (2) | (4) | (2) | (2) | (1) | |
| InDec | in<3> | in<4> | in<5> | in<6> | out<0> | out<1> | out<2> | out<3> | OutDec (x10 relative to in) |
| 0 | 0 | 0 | 0 | 0 | 0 | 0 | 0 | 0 | 0 |
| 2 | 0 | 0 | 0 | 1 | 0 | 0 | 0 | 1 | 1 |
| 4 | 0 | 0 | 1 | 0 | 0 | 1 | 0 | 0 | 2 |
| 6 | 0 | 0 | 1 | 1 | 1 | 1 | 0 | 1 | 3 |
| 8 | 0 | 1 | 0 | 0 | x | 0 | 0 | 0 | 4 |
| | | | | | x | x | x | x | |
| 10 | 0 | 1 | 0 | 1 | x | x | x | x | |
| 12 | 0 | 1 | 1 | 0 | 1 | 0 | 0 | 1 | 5 |
| 14 | 0 | 1 | 1 | 1 | 1 | 1 | 0 | 0 | 6 |
| 16 | 1 | 0 | 0 | 0 | 1 | 1 | 1 | 0 | 7 |
| 18 | 1 | 0 | 0 | 1 | 1 | 1 | 1 | 1 | 8 |
| | 1 | 0 | 1 | 0 | x | x | x | x | 9 |
| | 1 | 0 | 1 | 1 | x | x | x | x | |
| | 1 | 1 | 0 | 0 | x | x | x | x | |
| | 1 | 1 | 0 | 1 | x | x | x | x | |
| | 1 | 1 | 1 | 0 | x | x | x | x | |
| | 1 | 1 | 1 | 1 | x | x | x | x | | out<0>=in<3>+in<4>
out<1>=in<3>·in<4>+in<5>+in<3>·in<6>
out<2>=in<3>·in<5>+in<6>+in<3>·in<4>
out<3>=in<3> XOR in<6>

FIG.4

| WEIGHT: | INPUT-BCD-8421 | | | | | | | | OUTPUT-BCD-4221 | | | | |
|---|---|---|---|---|---|---|---|---|---|---|---|---|---|
| | (8) | (4) | (2) | (1) | | | | | (1)*10 | (4) | (2) | (2) | |
| inDEC | <0> | <1> | <2> | <3> | | | | | <0> | <1> | <2> | <3> | outDEC |
| 0 | 0 | 0 | 0 | 0 | | | | | 0 | 0 | 0 | 0 | 0 |
| 2 | 0 | 0 | 0 | 1 | | | | | 0 | 0 | 1 | 0 | 2 |
| 4 | 0 | 0 | 1 | 0 | | | | | 0 | 1 | 0 | 0 | 4 |
| 4 | 0 | 0 | 1 | 1 | | | | | 0 | 1 | 1 | 0 | 6 |
| 6 | 0 | 1 | 0 | 0 | | | | | 0 | 1 | 0 | 0 | 4 |
| 6 | 0 | 1 | 0 | 1 | | | | | 0 | 1 | 1 | 0 | 6 |
| 8 | 0 | 1 | 1 | 0 | | | | | 1 | 0 | 0 | 1 | 8 |
| 8 | 0 | 1 | 1 | 1 | | | | | 1 | 0 | 1 | 1 | 8 |
| 10 | 1 | 0 | 0 | 0 | | | | | 1 | 0 | 0 | 0 | 10 |
| 10 | 1 | 0 | 0 | 1 | | | | | 1 | 0 | 1 | 0 | 10 |
| 12 | 1 | 0 | 1 | 0 | | | | | 1 | 1 | 0 | 0 | 12 |
| 12 | 1 | 0 | 1 | 1 | | | | | 1 | 1 | 1 | 0 | 12 |
| 14 | 1 | 1 | 0 | 0 | | | | | 1 | 1 | 0 | 0 | 14 |
| 14 | 1 | 1 | 0 | 1 | | | | | 1 | 1 | 1 | 0 | 14 |
| 16 | 1 | 1 | 1 | 0 | | | | | 1 | 1 | 0 | 0 | 16 |
| 18 | 1 | 1 | 1 | 1 | | | | | 1 | 1 | 1 | 1 | 18 | out<0>=in<1>in<2>in<3>+in<0>in<3>
out<1>=in<0>in<1>in<2>in<3>+in<0>in<1>in<2>+in<0>in<1>in<3>+in<0>in<2>in<3>+in<0>in<2>+in<0>in<3>
out<2>=in<0>in<1>in<2>in<3>+in<0>in<1>in<2>+in<0>in<1>in<3>+in<0>in<2>in<3>+in<0>in<1>in<3>+in<0>in<2>in<3>
out<3>=in<0>in<1>in<2>in<3>+in<0>in<1>in<2>in<3>

FIG.6

DECIMAL FLOATING POINT MULTIPLIER AND DESIGN STRUCTURE

FIELD AND BACKGROUND OF INVENTION

This invention relates to the design of VLSI products and to arithmetic manipulation of numbers and particularly to multiplication of decimal system numbers.

Decimal multiplication using conventional binary coded decimal (BCD) notation is slower than the binary counterpart where the BCD coding is 8421. In this coding, a decimal number is represented by four bits, with values being assigned, from left to right, as 8421. That coding presents some invalid states for decimal numbers 10 through 15, preventing the use of conventional 3:2 compressor (adder) hardware used in parallel binary multiplication. Decimal multiplication is typically done one digit at a time, with partial products either being precomputed and stored in registers or evaluated as part of multiplication iteration, increasing the latency of the operation.

Recoding the multiplier is one technique for reducing the number of partial products that must be precomputed, but these are typically a signed digit notation requiring subtraction operations as well as addition operations when accumulating partial products. This again increases complexity of the operations.

SUMMARY OF THE INVENTION

With the foregoing in mind, one purpose of this invention is to implement decimal multiplication which uses a BCD 4221 encoding scheme. In realizing this purpose, the use of 3:2 compressors for partial product accumulation is enabled, in similarity to parallel binary multiplication.

Another purpose of this invention is to propose several implementations of the technology described, enabling a designer to select that implementation best adapted to other aspects of a chip or system design, such as the availability of space or operative elements in a design.

Another purpose of this invention is to provide a design structure which, when instantiated in a product or system, enables decimal multiplication technology as here described.

BRIEF DESCRIPTION OF DRAWINGS

Some of the purposes of the invention having been stated, others will appear as the description proceeds, when taken in connection with the accompanying drawings, in which:

FIG. 1 is a representation of the relationships among hexadecimal, BCD and decimal coding;

FIG. 2 is a representation of the function of an operative element which works as a doubler and converter from BCD 8421 to BCD 4221;

FIG. 3 is an example of the function of the doubler of FIG. 2;

FIG. 4 is a representation of the function of an operative element which works as a quintupler and converter from BCD 8421 to BCD 4221;

FIG. 5 is an example of the function of the quintupler of FIG. 4;

FIG. 6 is a representation of the function of an operative element which works to shift and convert processed digits;

FIG. 7 is an example of the function of the shift and convert element of FIG. 6;

DETAILED DESCRIPTION OF INVENTION

Figure 8A:
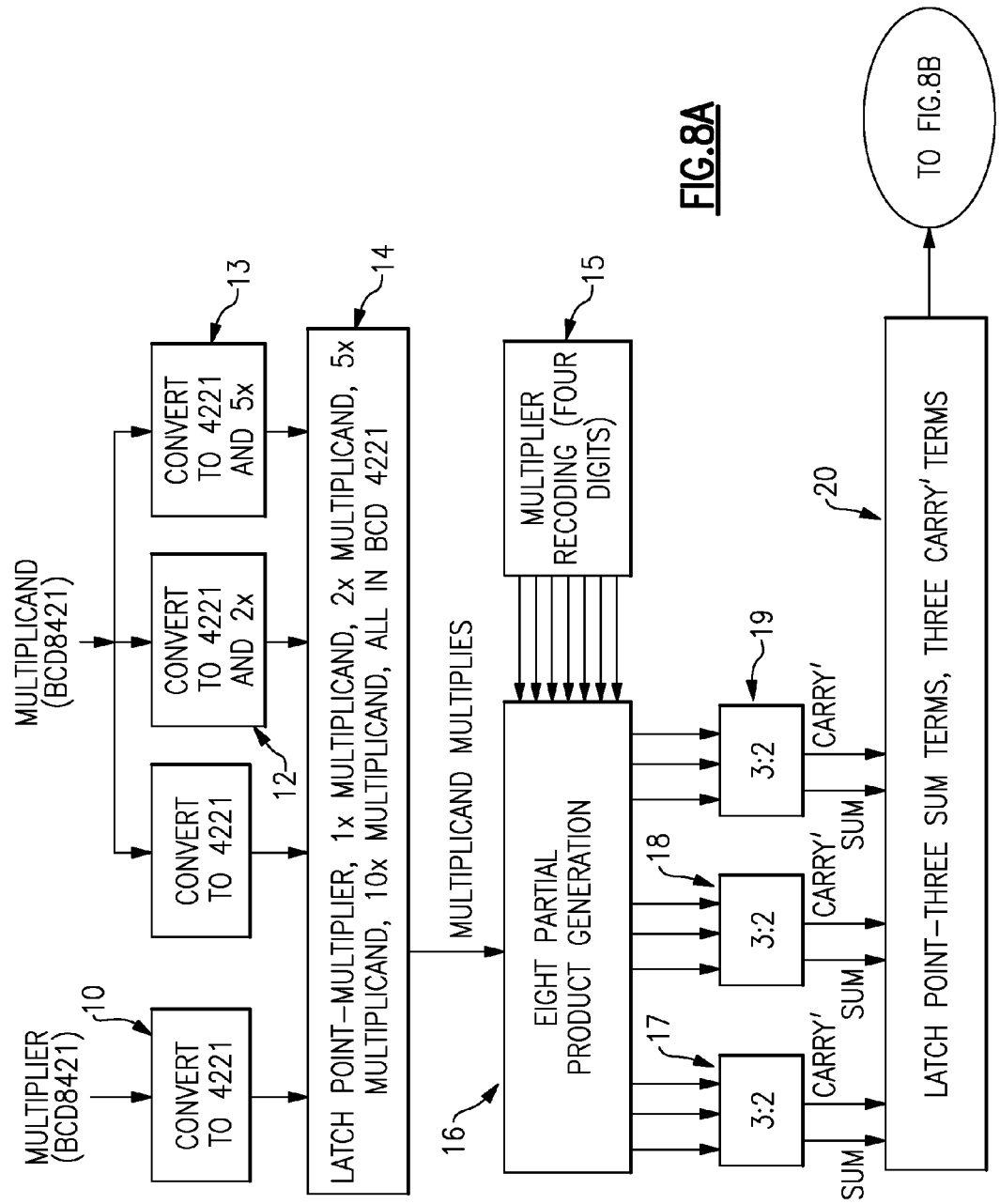
FIGS. 8A through 8D are an illustration of operative elements for accommodating multiplication in accordance with this invention in which a multiplier is processed four digits at a time.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

As will be appreciated by one skilled in the art, aspects of the present invention described hereinafter may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium such as the optical disc shown in FIG. 11 at 150. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As an apparatus, the present invention comprises first operative elements which accept a multiplier and a multiplicand to be used in decimal multiplication and convert the multiplier and multiplicand into a plurality of separately accumulated partial products coded in BCD 4221 format; second operative elements associated with the first operative elements and which accumulate the plurality of partial products into a final product; and third operative elements associated with the first and second elements and which convert the final product to BCD 8421 format. As a method, the present invention comprises accepting a multiplier and a multiplicand to be used in decimal multiplication and converting the multiplier and multiplicand into a plurality of separately accumulated partial products coded in BCD 4221 format; accumulating the partial products into a final product; and converting the final product to BCD 8421 format. As a design structure readable by a machine used in design, manufacture, or simulation of an integrated circuit, the design structure comprises first operative elements which accept a multiplier and a multiplicand to be used in decimal multiplication and convert the multiplier and multiplicand into a plurality of separately accumulated partial products coded in BCD 4221 format; second operative elements associated with the first operative elements and which accumulate the plurality of partial products into a final product; and third operative elements associated with the first and second elements and which convert the final product to BCD 8421 format.

The flow of the algorithm contemplated by the invention is:

(a) Convert a decimal multiplier and multiplicand into a plurality of separately accumulated partial products, each of which is coded in BCD-4221;

(b) Accumulate (as quickly as possible) the plurality of partial products into just two partial products; and (c) Use an addition circuit to add the two remaining partial products, creating the final product.

FIG. 1 includes a description of the BCD-4221 number system. It shows the conversions among Decimal, Hexadecimal and two BCD systems, BCD-8421 and BCD-4221. Since the BCD-4221 system has redundancy built into it, a 'greedy' system has been used for all optimizations as it was deemed the best in order to reduce logic. For example, Decimal 4 can be represented: 1000 or 0110. Here, 1000 is chosen to always choose the largest position first. Another example: Decimal 2 can be 0100 or 0010. Thus, 0100 is chosen because the leftmost position is greater.

FIGS. 2 and 3 deal with conversion of a BCD-8421 input to BCD-4221 output and the doubling (also sometimes indicated as 2× in tables and figures) used in certain steps of the inventive process as described hereinafter. FIGS. 4 and 5 similarly deal with a quintupling (sometimes indicated as 5× in tables and figures) used in certain steps of the inventive process as described hereinafter. FIGS. 6 and 7 deal with shift and conversion steps used in certain stages of the inventive process described hereinafter.

Given certain anticipated chip area/circuit timing constraints, it may be required to break up the multiplier into different pieces. For example, where the multiplication is of 12-digit numbers as both multiplier and multiplicand, instead of doing the full 12-digit by 12-digit multiply, the multiplier is separated into three pieces. Each piece consists of a 4-digit (multiplier) by 12-digit (multiplicand) multiply (lowest order 4 digits of the multiplier are processed first; highest order 4 digits of the multiplier are processed last), then the three intermediate results are aligned and joined to create the final product. Alternatively, depending on the constraints, the multiplier may be broken into four 3-digit pieces, or even six 2-digit pieces. This will result in differing implementations of the invention as becomes more clear hereinafter. Being able to represent numbers in the BCD-4221 format enables taking advantage of fast 3:2 carry sum adders or compressors to accumulate each of a plurality of partial products and the group of partial products into a final product as described here.

So, taking the example of a 4-digit by 12-digit multiply (4-digit long multiplier being multiplied by a 12-digit long multiplicand) the implementation is as shown in FIGS. 8A, 8B, 8C, and 8D. A 4-digit by 12-digit multiplication can produce up to 16-digits in the result. Here the process is to convert the 4-digit multiplier into BCD-4221 format (at 10 in FIG. 8A) as well as create different multiples of the multiplicand in BCD-4221 format. The different multiples desired are: 1×, 2×, 5×, 10×. The 1× multiple (1*multiplicand) requires a simple conversion of the multiplicand to 4221 (see FIG. 1, at 11 in FIG. 8A). This multiple will be 12-digits long. The 2× multiple (2*multiplicand) requires a doubler circuit (see FIGS. 2 and 3, at 12 in FIG. 8A) that doubles the multiplicand and converts to 4221. This multiple will be 12 or 13-digits long. The 5× multiple (5*multiplicand) requires the use of a quintupler circuit (see FIGS. 4 and 5, at 13 in FIG. 8A) that will create the 5× multiple in 4221 format. This multiple will be 12 or 13-digits long. These are stored in what is identified at 14 in FIG. 8A as a latch point. The 10× multiple (10*multiplicand) is easy to produce, only requiring a 1-digit left shift of the already produced 1× multiple. This multiple will be 13-digits long. It is also important to note that creating the negated version of a multiple is not difficult and is assumed to be available as well.

Each of the four multiplier digits (where each digit has a value of 0-9) is then recoded into two digits, where the "upper" digit can be 0, 1, 2, and the "lower" digit can be −2, −1, 0, 1, 2 (at 15 in FIG. 8A). Thus it is possible to create any number, 0-9, using two digits in a radix-5 format based on the following equation:

multiplier_digit($Y$)=($5^1$)*$Y\_Upper$+($5^0$)*$Y\_Lower$

This is equal to:

multiplier_digit($Y$)=5*$Y\_Upper$+$Y\_Lower$

Expressed in a table:

TABLE 1

| Multiplier Digit (Y) | Radix-5 upper digit (Y_Upper) | Radix-5 lower digit (Y_Lower) |
|---|---|---|
| 0 | 0 | 0 |
| 1 | 0 | 1 |
| 2 | 0 | 2 |
| 3 | 1 | −2 |
| 4 | 1 | −1 |
| 5 | 1 | 0 |
| 6 | 1 | 1 |
| 7 | 1 | 2 |
| 8 | 2 | −2 |
| 9 | 2 | −1 |

So, in this example, if the multiplier digits have the value of 2678, the recode will be (remembering that the values of Y_Upper, Y_Lower are restricted to be −2, −1, 0, 1, 2):
   2=5*0+2, so Y_Upper=0, Y_Lower=2
   6=5*1+1, so Y_Upper=1, Y_Lower=1
   7=5*1+2, so Y_Upper=1, Y_Lower=2
   8=5*2+(−2), so Y_Upper=2, Y_Lower=−2
Once the multiplicand multiples have been generated and the multiplier recoded, a plurality of partial products are generated (at 16 in FIG. 8A). Since the multiplier is now being represented by eight digits, eight partial products will be created.

The partial products are created as follows:

TABLE 2

| Y_upper | Corresponding partial product |
|---|---|
| 0 | 0 |
| 1 | 5× multiple of the multiplicand |
| 2 | 10× multiple of the multiplicand |

TABLE 3

| Y_lower | Corresponding partial product |
|---|---|
| −2 | 2× multiple of the multiplicand (negated) |
| −1 | 1× multiple of the multiplicand (negated) |
| 0 | 0 |
| 1 | 1× multiple of the multiplicand |
| 2 | 2× multiple of the multiplicand |

Given the original four multiplier digits in this example, the eight partial products will be:
   0× multiple (from multiplier digit 2)
   2× multiple (from multiplier digit 2)
   5× multiple (from multiplier digit 6)
   1× multiple (from multiplier digit 6)
   5× multiple (from multiplier digit 7)
   2× multiple (from multiplier digit 7)
   10× multiple (from multiplier digit 8)
2× multiple (from multiplier digit 8) (Note: This partial product will be negated, so it will really be −2*multiplicand)

Figure 8B:
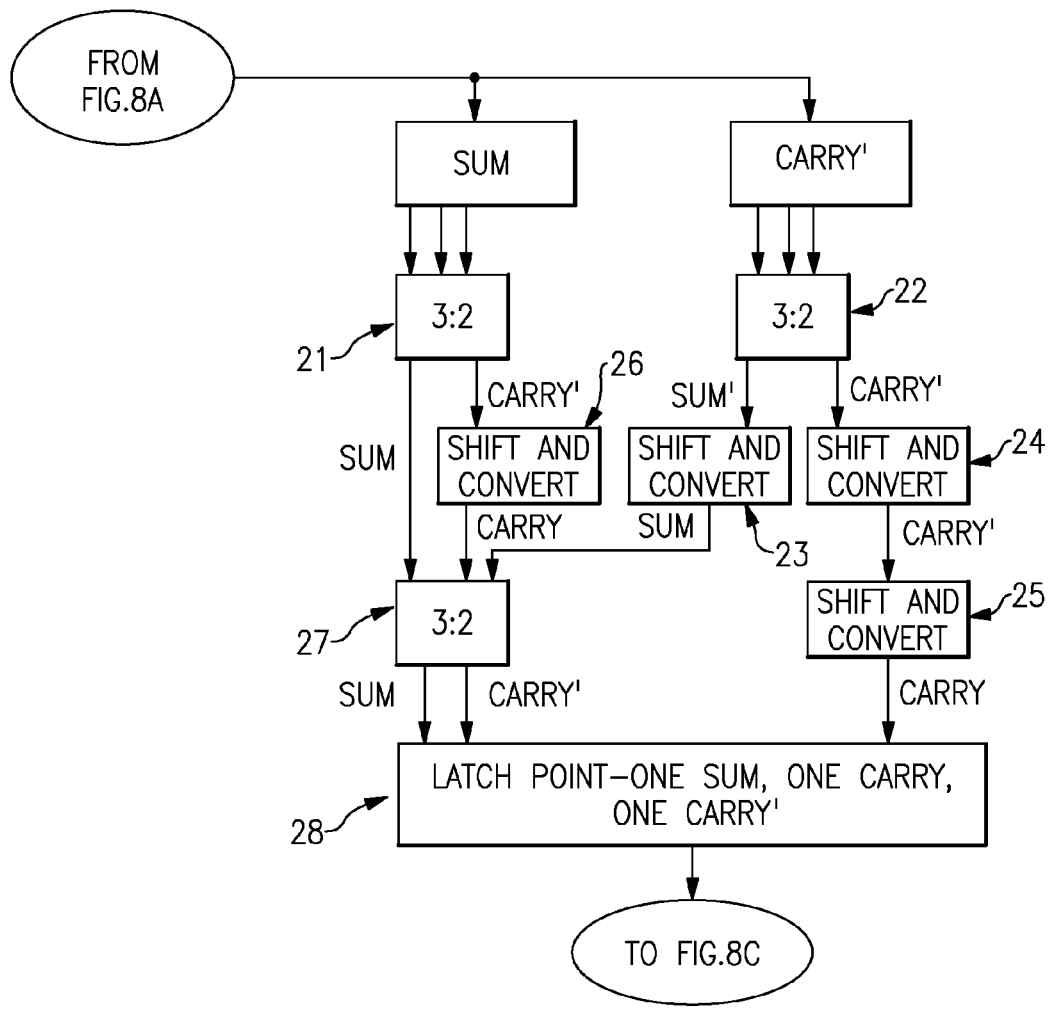
Figure 8C:
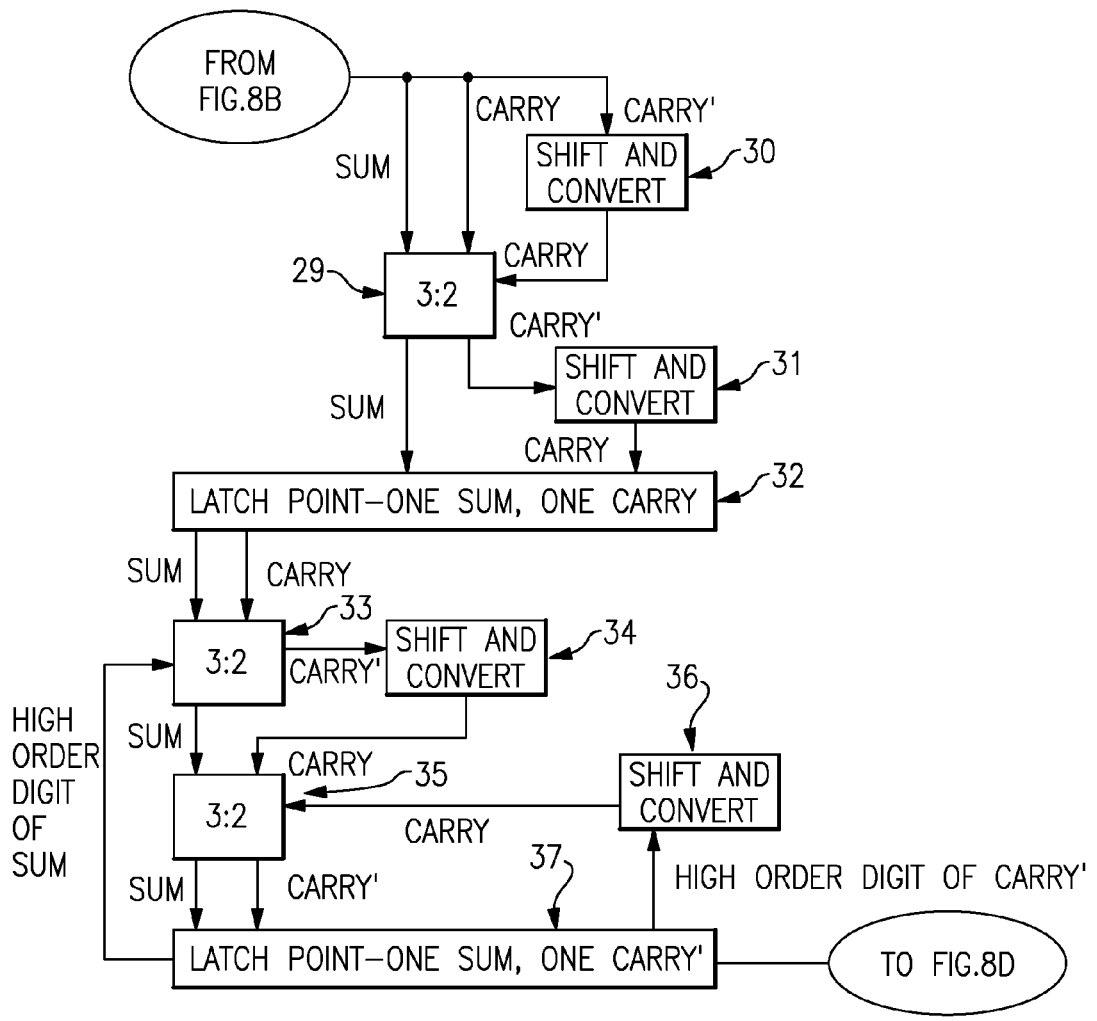

Once these partial products have been determined, they are aligned in what is sometimes referred to as a partial product tree, such that the partial products corresponding to multiplier digit 7 are left shifted by one digit relative to the partial products corresponding to multiplier digit 8, the partial products corresponding to multiplier digit 6 are left shifted by one digit relative to the partial products corresponding to multiplier digit 7, and the partial products corresponding to multiplier digit 2 are left shifted by one digit relative to the partial products corresponding to multiplier digit 6. In addition to these eight partial products, two more partial products, corresponding to feedback from a previous 4-digit by 12-digit multiplication, may be added to the partial product tree. Once all the partial products, which are in BCD-4221, are so aligned, 3:2 compressors, (otherwise known as carry-save adders) are used to accumulate the plurality of partial products. When three input operands are fed into a 3:2 compressor (at 17, 18 and 19 in FIG. 8A), the resulting outputs represent a SUM and a CARRY, stored at a latch point 20. The SUM is a BCD-4221 operand that is equal in length and alignment to the compressor inputs. In this implementation, three SUM terms then pass through another compressor stage 21 (FIG. 8B). Three CARRY terms pass through a compressor stage 22 (FIG. 8B). A CARRY term needs to go through a shift and conversion process (for example, at 24 in FIG. 8B for the CARRY output of the compressor 22 and 26 for the CARRY output of the compressor 21) that will produce a BCD-4221 operand that is aligned and up to one bit longer than the compressor input. This conversion process is shown in FIGS. 6 and 7. In FIGS. 8A through 8D, an operand that is in need of a conversion will be denoted with a trailing apostrophe. It should be noted that the conversion process does not need to be performed before that operand can be fed into the next 3:2 compressor. If there are three operands that require a conversion, they can continue down the partial product tree into the next 3:2 compressor (for example, as shown at 22 in FIG. 8B). The results of this compressor are a SUM' that requires a single conversion as at 23 and a CARRY" that will require two conversions as at 24 and 25. Although not discussed explicitly, different well known sign-extension techniques can be used within the partial product tree to handle the processing of negative partial products and the potential carrys that they produce. At the conclusion of the accumulation process, only two partial products, one SUM and one CARRY, will remain.

En route to that result, the outputs from the compressor 21, conversion 26 and conversion 23 are passed through a compressor 27 to a latch point 28 which also receives the CARRY output which has passed from compressor 22 through the conversions 24 and 25. These latched values then pass to the elements illustrated in FIG. 8C. There, the latched SUM, CARRY and CARRY' values are passed to a compressor 29 (the CARRY' first having passed through a conversion 30) to produce a SUM and CARRY', the latter passing through a conversion 31, which reach a latch point 32. SUM and CARRY values from this latch point 32 are passed to a compressor 33 along with any high order digits for earlier processing. An output CARRY' is passed to a conversion 34.

These values are passed through a compressor 35 along with high order digits of CARRY' which have passed through a conversion 36. The resulting SUM and CARRY' are stored at a latch point 37 and include feedback data. The latched SUM and CARRY' are then passed (to the elements of FIG. 8D) through a conversion to BCD8421 (38 for SUM, 39 for the CARRY which results from a conversion 40). These converted values may then be passed to a decimal adder 41 which supplies a result to a latch point 42.

Figure 8D:
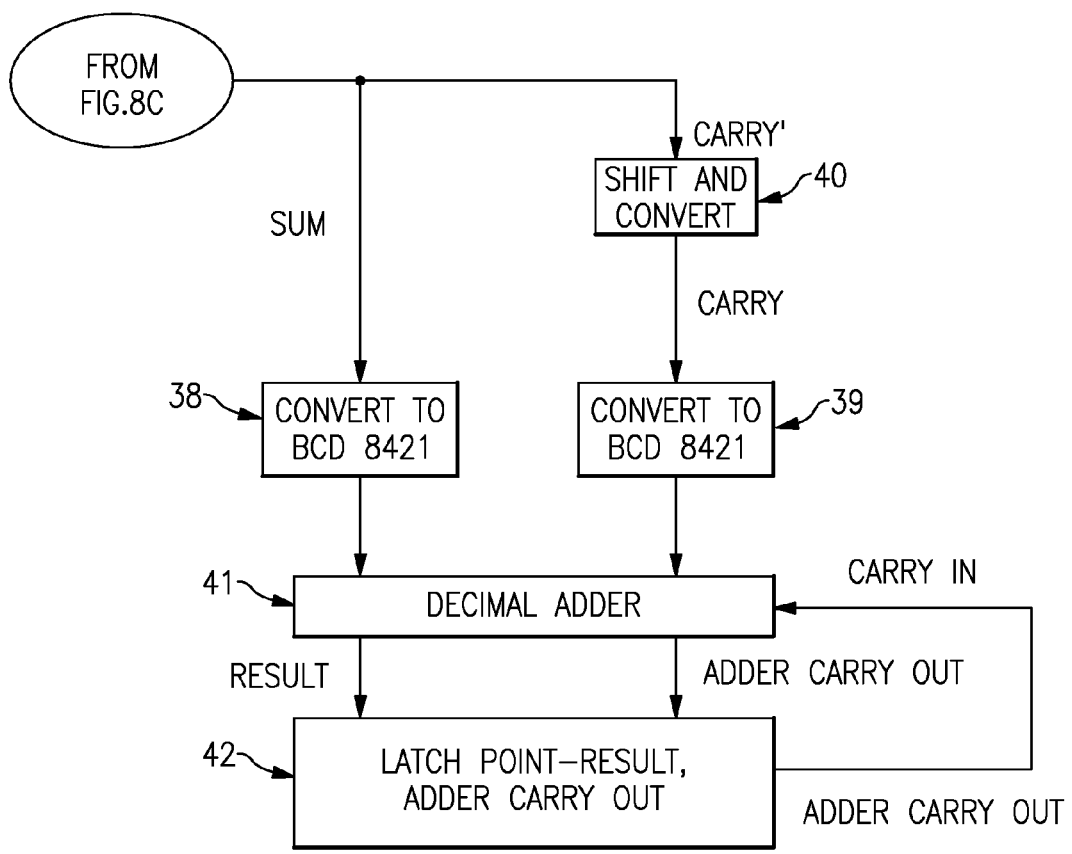
Figure 9A:
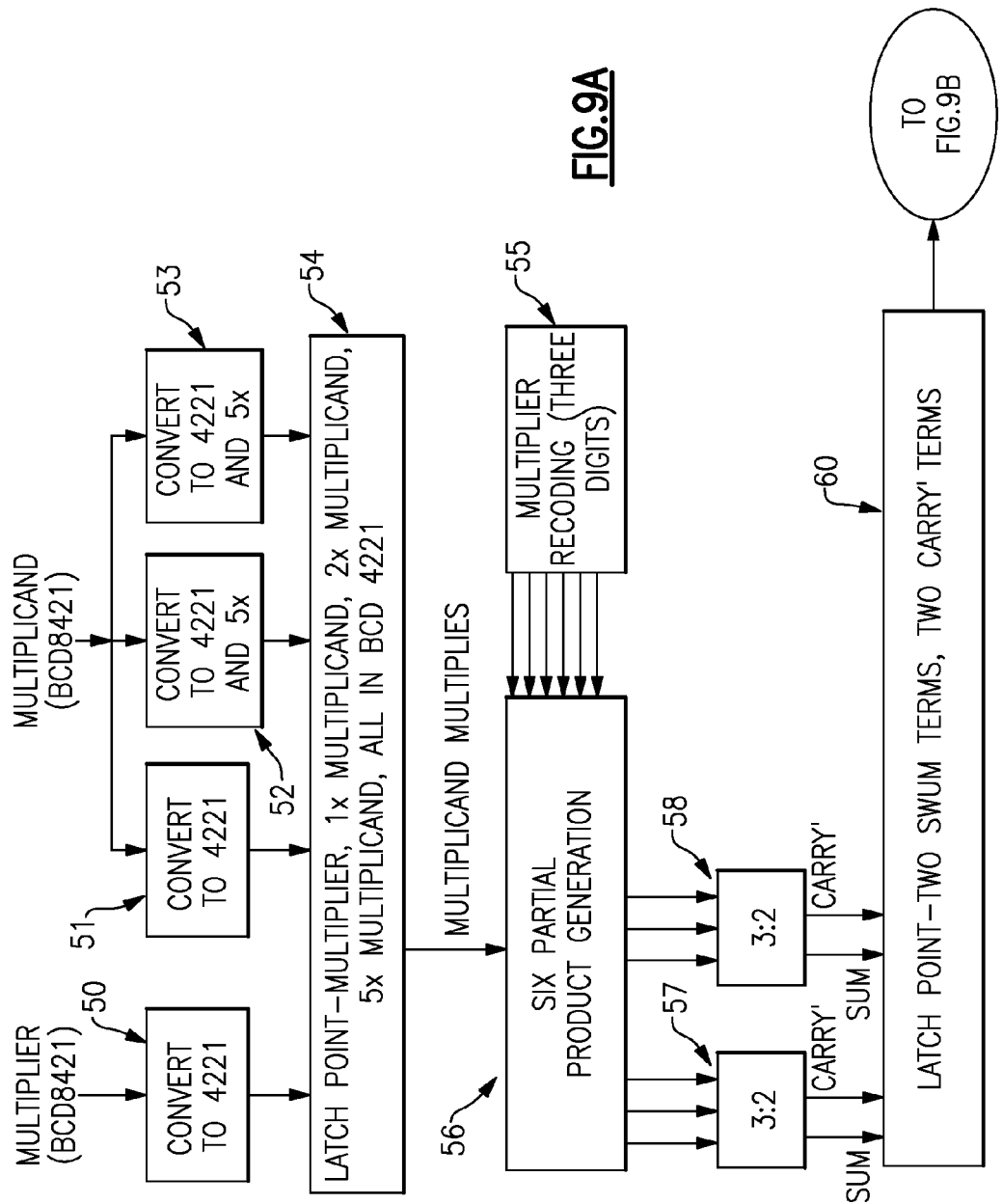
FIGS. 9A through 9D are an illustration of operative elements for accommodating multiplication in accordance with this invention in which a multiplier is processed three digits at a time.
Figure 9B:
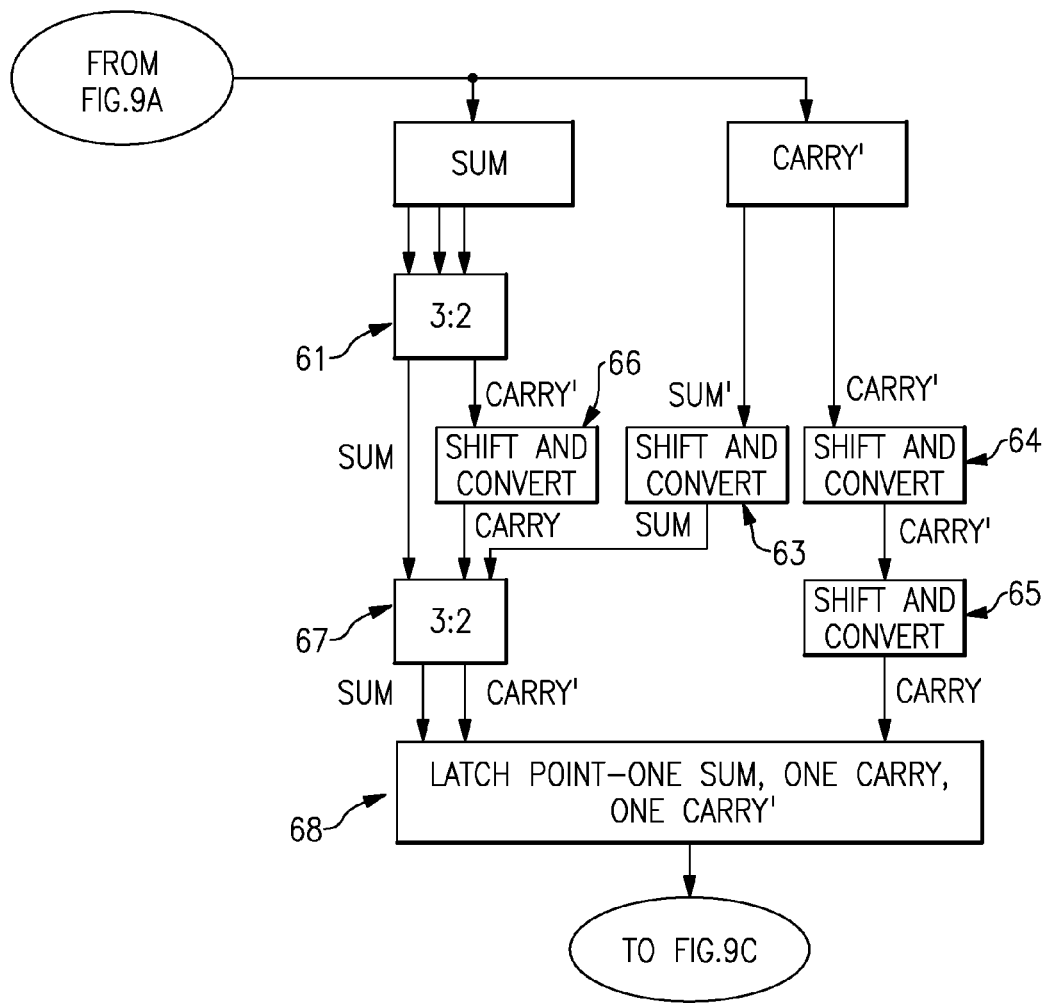
Figure 9C:
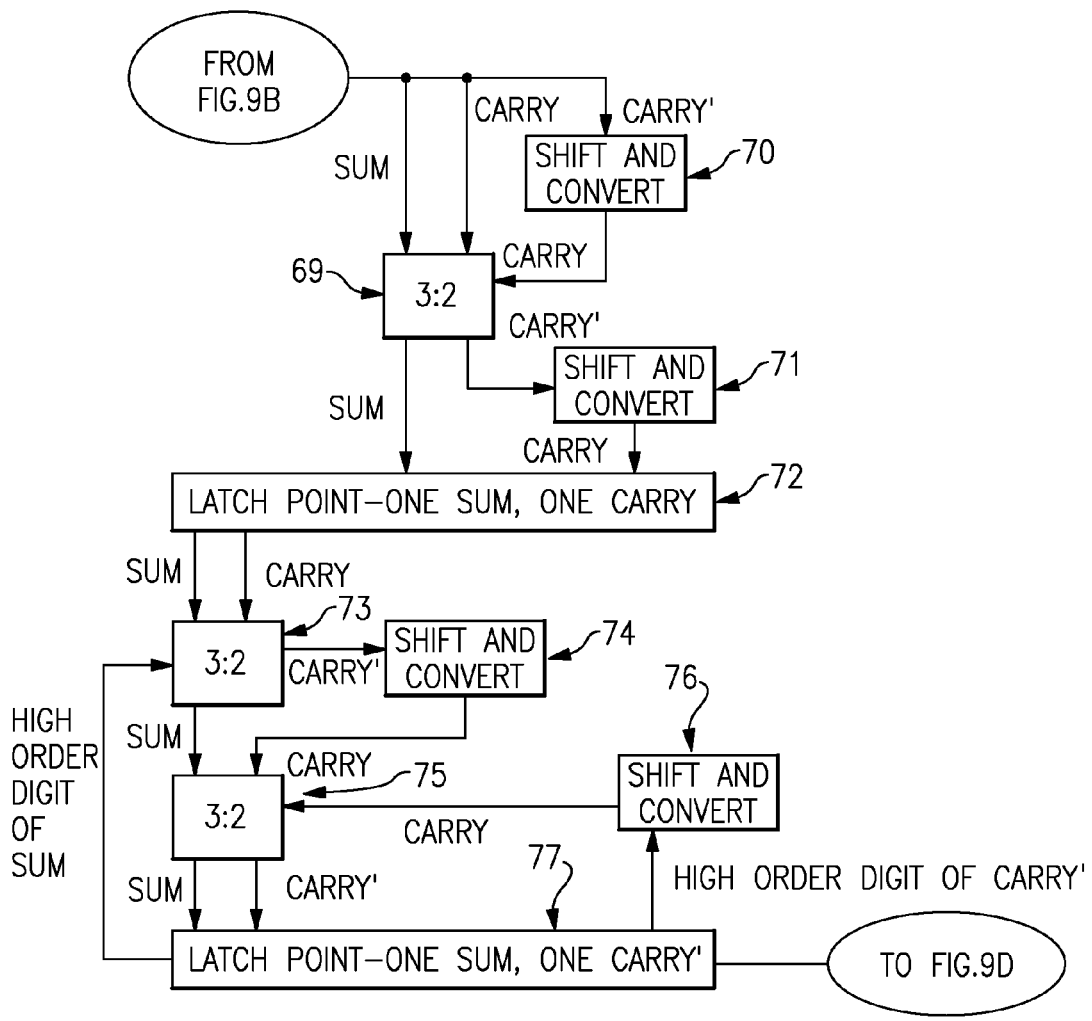
Figure 9D:
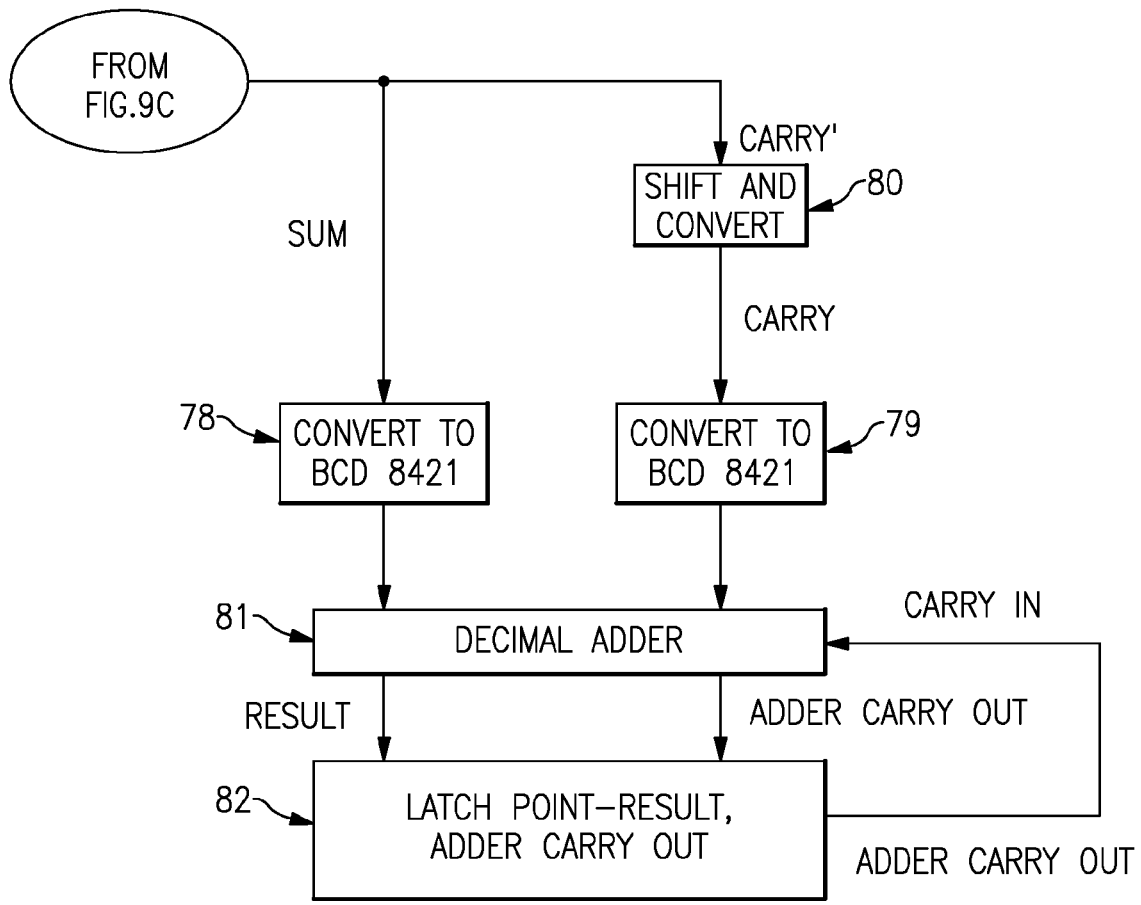

If the four multiplier digits used in the 4-digit by 12-digit multiplication represented the middle or lower order digits of the original multiplier, then the high-order 12 digits from the two remaining partial products are fed into the next 4-digit by 12-digit multiplication iteration as the ninth and tenth partial products, and the low-order four digits of the two remaining partial products are converted to BCD-8421 (at 38 in FIG. 8D) and sent through a decimal adder (at 41 in FIG. 8D). If the adder produces a carry-out, it is fed back into the adder as a "carry-in" during the next 4-digit by 12-digit multiplication iteration. The 4-digit result from the adder is stored away at the latch point 42 to create the final result when all multiplication iterations are completed. After completion of this add, four digits of the multiplier have been resolved or retired, as have four digits of the final result (that is, of the 16 digits produced in the multiplication, the low-order four digits are retired and the high-order 12 digits will be fed into the next 4-digit by 12-digit multiplication). "Resolution" or "retirement" are here used to signify partial completion of the multiplication undertaken.

If the four multiplier digits used in this 4-digit by 12-digit multiplication represented the highest order four digits of the original 12-digit multiplier, then the two remaining partial products, in their entirety, are fed into the decimal adder. The result of this add is joined together with the results from the previous iterations to create the final product.

Figure 10A:
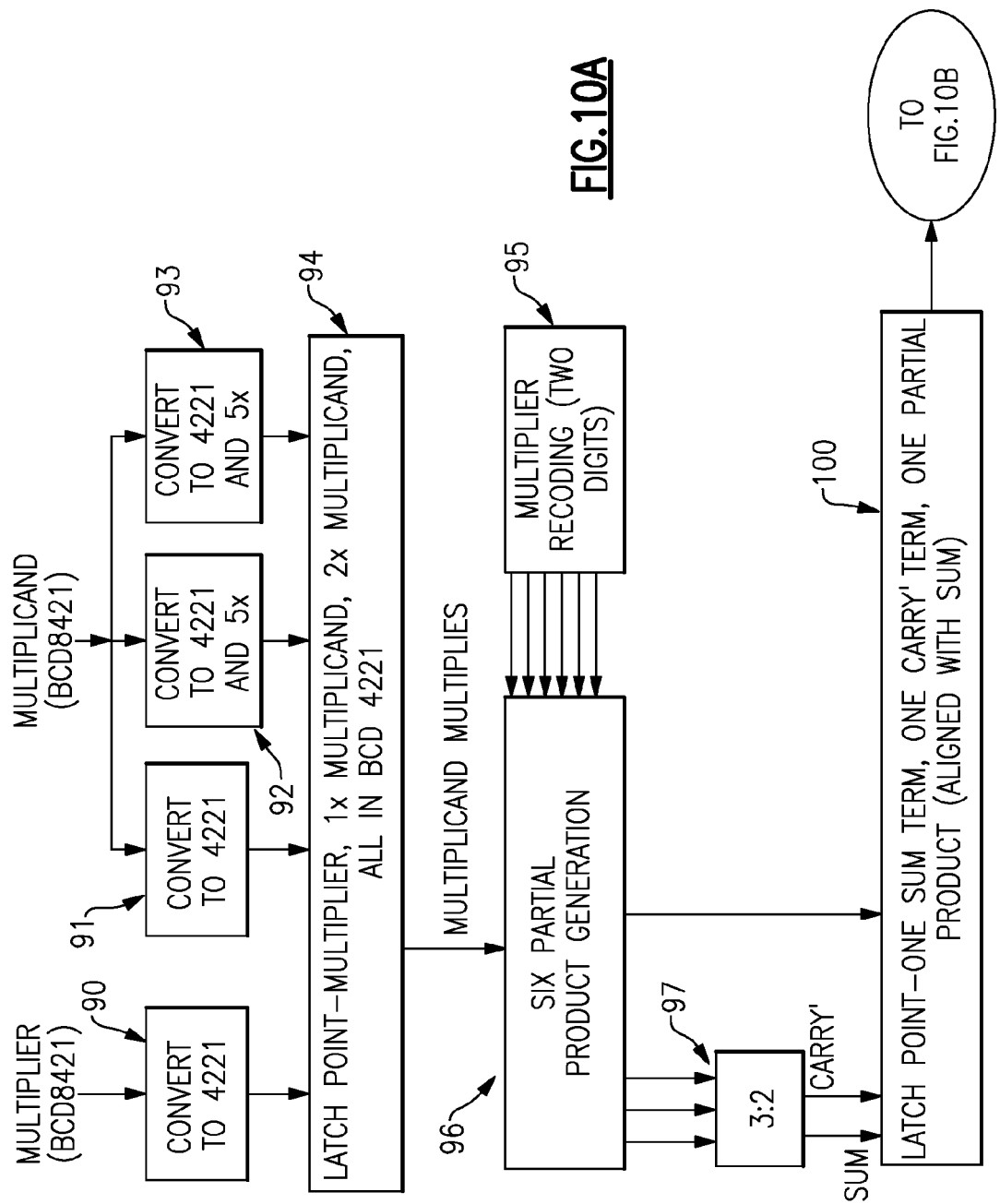
FIGS. 10A through 10C are an illustration of operative elements for accommodating multiplication in accordance with this invention in which a multiplier is processed two digits at a time.
Figure 10B:
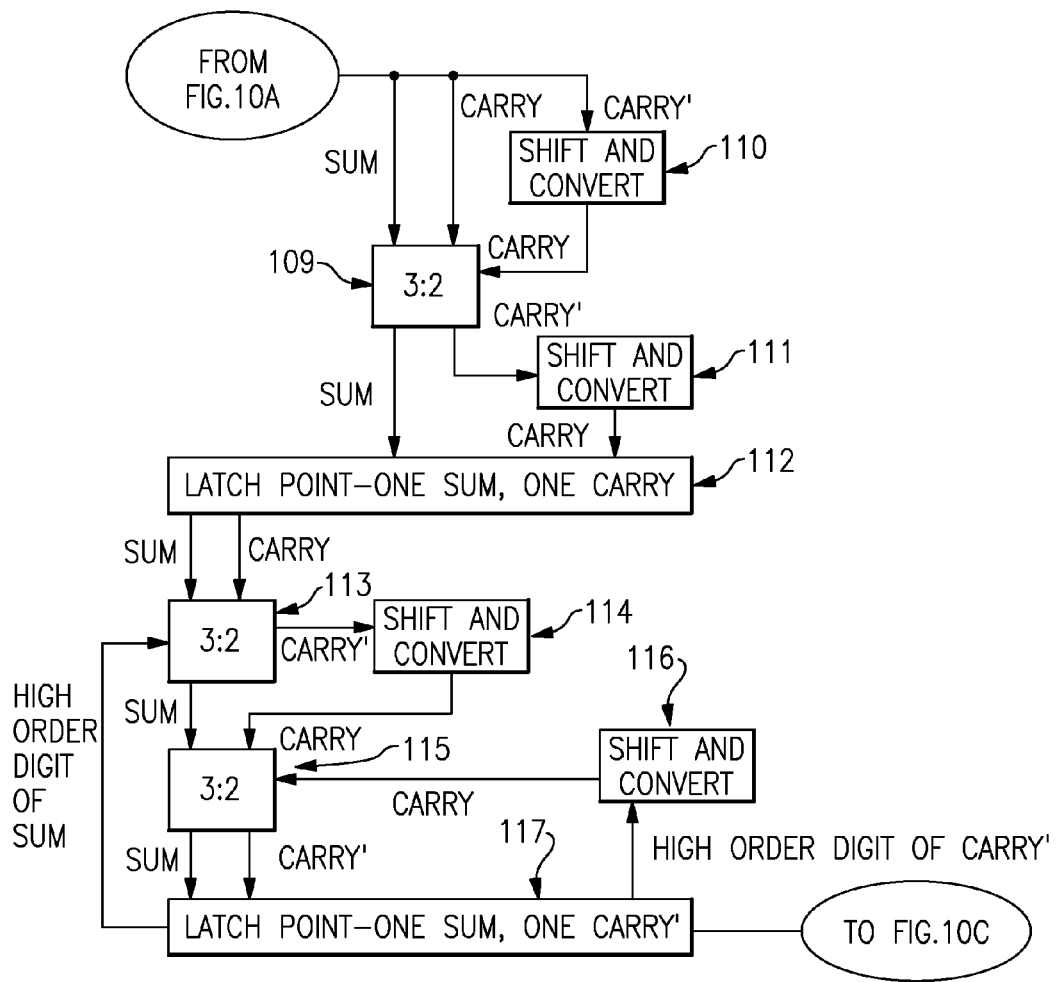
Figure 10C:
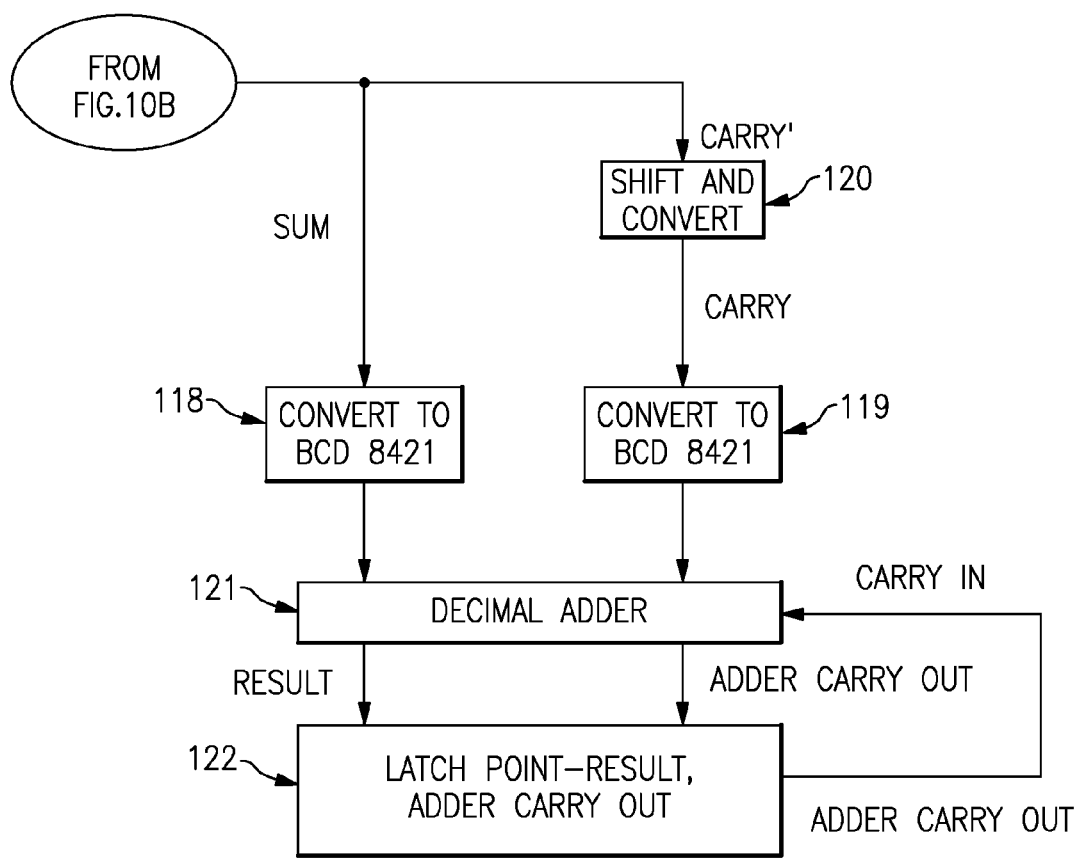

It is to be understood that the implementation described to this point uses the operative elements illustrated in FIGS. 8A through 8D. Alternative implementations are illustrated where three (in FIGS. 9A, 9B, 9C, and 9D) or two (in FIGS. 10A, 10B, and 10C) multiplier digits are used in the process generally as described. These alternative implementations are shown in order to illustrate that a designer may have choices which will impact chip landscape considerations and/or operational speed. The illustrations are simplified by the intentional omission of certain of the elements shown in greater detail in FIGS. 8A through 8D and described here, with the expectation that a person of skill in the applicable arts will be able to note such omissions and apply the teachings of the exemplary FIGS. 8A through 8D to the simplified FIGS. 9A through 9D and 10A through 10C. Operative elements in FIGS. 9A, 9B, 9C, 9D, 10A, 10B, and 10C corresponding generally to those of FIGS. 8A through 8D have been given reference characters of the higher order sequences, as 50 through 81 and 90 through 121. The interested reader should note that not all of the reference characters are used or find parallel elements in the simplified Figures, a natural consequence of the reduced number of multiplier digits used. It is to be recognized that working with lesser numbers of multiplier digits results in fewer operative elements, thus appearing to further simplify the illustrations. However, the three different designs provide an area versus performance tradeoff. They describe how to perform multiplication of two digits at a time over four pipeline stages (FIGS. 10A, 10B, and 10C), how with additional hardware multiplication of three digits at a time over five pipeline stages can be done (FIGS. 9A, 9B, 9C, and 9D), and finally, with a moderate amount of additional hardware over the three digit per cycle design, how multiplication of four digits at a time can be performed over five pipeline cycles (FIGS. 8A through 8D). The discussion above is particularly directed to the last mentioned implementation and is believed to be clearly sufficient to enable a person of skill in the applicable arts to implement the invention with the chosen performance and chip landscape requirements.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention is contemplated as useful within a processor, where the invention is embodied in integrated circuit chips, such chips can be distributed by a fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor unit.

Figure 11:
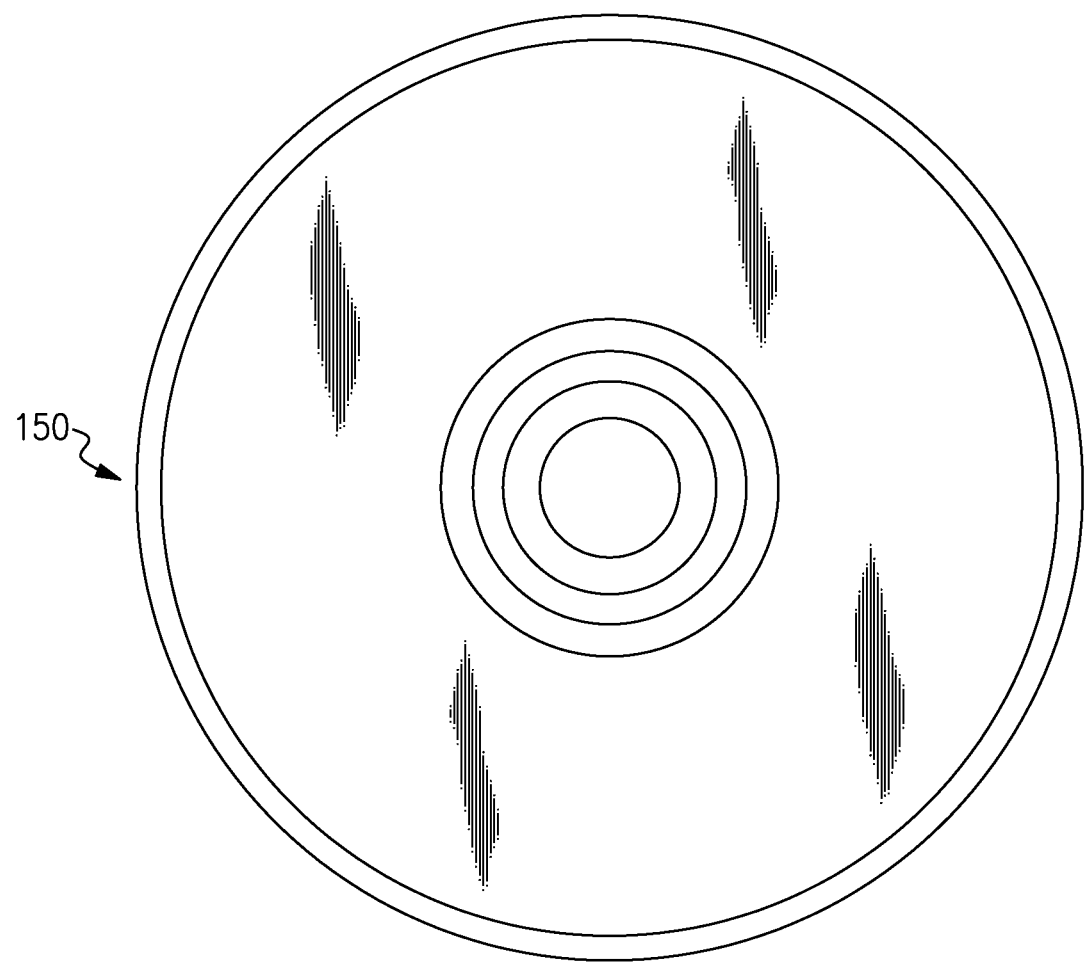
FIG. 11 is a representation of one form of storage media for a computer program product.
Figure 12:
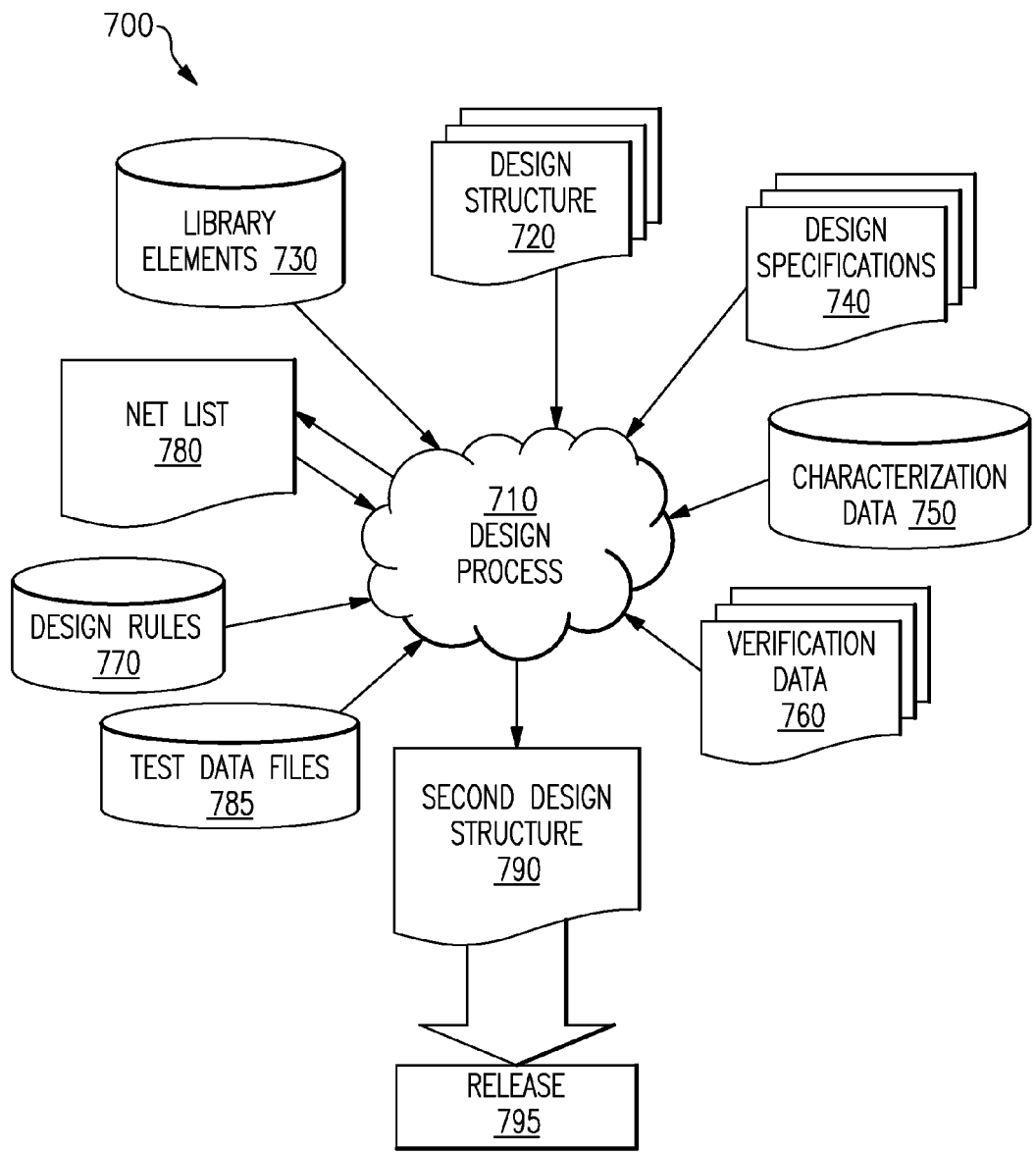
FIG. 12 is a flow diagram of a design process used in semiconductor design, manufacture, and/or test.

FIG. 11 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of the design structures and/or devices described above and shown in FIGS. 8A and 8B through 10A, 10B and 10C. The design structures processed and/or generated by design flow 700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

FIG. 11 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a machine-readable data transmission, gate array, or storage medium, design structure 720 may be accessed and processed by one or more hardware and/or software modules within design process 710 to simulate or otherwise functionally represent an electronic component, circuit, electronic or logic module, apparatus, device, or system such as those shown in FIGS. 8A and 8B through 10A, 10B and 10C. As such, design structure 720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Referring now to FIG. 11, Design process 710 preferably employs and incorporates hardware and/or software modules for synthesizing, translating, or otherwise processing a design/simulation functional equivalent of the components, circuits, devices, or logic structures shown in FIGS. 8A and 8B through 10A, 10B and 10C to generate a netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 710 may include hardware and software modules for processing a variety of input data structure types including netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in a ICES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 8 through 10. In one embodiment, design structure 790 may comprise a compiled, executable HDL simulation model that functionally simulates the devices shown in FIGS. 8 through 10.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 8A and 8B through 10A and 10B. Design structure 790 may then proceed to a stage 795 where, for example, design structure 790: proceeds to tape-out, is released to manufacturing, is released to a mask house, is sent to another design house, is sent back to the customer, etc.

In the drawings and specifications there has been set forth a preferred embodiment of the invention and, although specific terms are used, the description thus given uses terminology in a generic and descriptive sense only and not for purposes of limitation.

What is claimed is:

1. An integrated circuit implemented method for multiplying an 8421 coded BCD decimal multiplicand by an 8421 coded BCD decimal multiplier, the method comprising:
converting, by the 8421 coded BCD decimal multiplier, the multiplicand into a corresponding first representation, the first representation consisting of a first plurality of 4221 coded BCD decimals;
converting the multiplier into a second representation, the second representation comprising two special code representations for each multiplier decimal digit;
based on the first representation and the second representation, determining a plurality of first partial products, each partial product consisting of 4221 coded BCD decimals;
accumulating the plurality of first partial products into two 4221 coded BCD decimal partial products;
converting the two 4221 coded BCD decimal partial products into 8421 coded BCD decimal partial products; and
arithmetically adding the two 8421 coded BCD decimal partial products to produce a final 8421 coded BCD decimal product.

2. The method according to claim 1, wherein 4221 coded BCD decimals consist of greedy 4221 codes.

3. The method according to claim 1, wherein first representation consists of 2 or more 4221 coded BCD decimals.

4. The method according to claim 1, further comprising using a doubler and a quintupler to determine the first partial products, the first partial products comprising a 5× partial product and a 2× partial product.

5. The method according to claim 4, wherein a first partial product of the first partial products consists of one of a positive set of a 10× partial product, a 5× partial product, a 2× partial product, and a 1× partial product and a negative set of a 10× partial product, a 5× partial product, a 2× partial product, and a 1× partial product.

6. The method according to claim 1, wherein the two special code representations comprise an upper digit consisting of any one of 0, 1 or 2, and a lower digit consisting of any one of −2, −1, 0, 1 or 2.

7. An electronic circuit for multiplying an 8421 coded BCD decimal multiplicand by an 8421 coded BCD decimal multiplier, the circuit comprising:
a first converter for converting the multiplicand into a corresponding first representation, the first representation consisting of a first plurality of 4221 coded BCD decimals;
a second converter for converting the multiplier into a second representation, the second representation comprising two special code representations for each multiplier decimal digit;
a multiplier for determining, based on the first representation and the second representation, a plurality of first partial products, each partial product consisting of 4221 coded BCD decimals;
an accumulator for accumulating the plurality of first partial products into two 4221 coded BCD decimal partial products;
a final convertor for converting the two 4221 coded BCD decimal partial products into 8421 coded BCD partial products; and
an addition circuit for arithmetically adding the two 8421 coded BCD decimal partial products to produce a final 8421 coded BCD decimal final product.

8. The circuit according to claim 7, wherein said first converter conversion to 4221 coded BCD decimals consists of greedy 4221 codes.

9. The circuit according to claim 7, wherein said first converter conversion into said first representation consists of 2 or more 4221 coded BCD decimals.

10. The circuit according to claim 7, wherein said multiplier comprises a doubler and a quintupler to determine the first partial products, the first partial products comprising a 5× partial product and a 2× partial product.

11. The circuit according to claim 10, wherein said multiplier determines a first partial product of the first partial products to consist of one of a positive set of a 10× partial product, a 5× partial product, a 2× partial product, and a 1× partial product and a negative set of a 10× partial product, a 5× partial product, a 2× partial product, and a 1× partial product.

12. The circuit according to claim 7, wherein said second converter generates the two special code representations as an upper digit consisting of any one of 0, 1 or 2, and a lower digit consisting of any one of −2, −1, 0, 1 or 2.

13. A computer program product for multiplying an 8421 coded BCD decimal multiplicand by an 8421 coded BCD decimal multiplier, the computer program product comprising a storage medium, readable by a processing circuit for performing a method comprising:
converting the multiplicand into a corresponding first representation, the first representation consisting of a first plurality of 4221 coded BCD decimals;
converting the multiplier into a second representation, the second representation comprising two special code representations for each multiplier decimal digit;
based on the first representation and the second representation, determining a plurality of first partial products, each partial product consisting of 4221 coded BCD decimals;
accumulating the plurality of first partial products into two 4221 coded BCD decimal partial products;
converting the two 4221 coded BCD decimal partial products into 8421 coded BCD decimal partial products; and
arithmetically adding the two 8421 coded BCD decimal partial products to produce a final 8421 coded BCD decimal product.

14. The program product according to claim 13, wherein said first converter conversion to 4221 coded BCD decimals consists of greedy 4221 codes.

15. The program product according to claim 13, wherein said first converter conversion into said first representation consists of 2 or more 4221 coded BCD decimals.

16. The program product according to claim 13, wherein said multiplier comprises a doubler and a quintupler to determine the first partial products, the first partial products comprising a 5× partial product and a 2× partial product.

17. The program product according to claim 16, wherein said multiplier determines a first partial product of the first partial products to consist of one of a positive set of a 10× partial product, a 5× partial product, a 2× partial product, and a 1× partial product and a negative set of a 10× partial product, a 5× partial product, a 2× partial product, and a 1× partial product.

18. The program product according to claim 13, wherein said second converter generates the two special code representations as an upper digit consisting of any one of 0, 1 or 2, and a lower digit consisting of any one of −2, −1, 0, 1 or 2.

* * * * *